(12) United States Patent
Merlin et al.

(10) Patent No.: US 9,380,512 B2
(45) Date of Patent: Jun. 28, 2016

(54) REPRESENTATION AND SOLUTIONS FOR SIMULTANEOUS TRANSMISSIONS OVER BROADCAST MEDIUM

(71) Applicant: Raytheon BBN Technologies Corp., Cambridge, MA (US)

(72) Inventors: Christophe Jean-Claude Merlin, Malden, MA (US); William Nii Tetteh, Cambridge, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 89 days.

(21) Appl. No.: 14/174,510

(22) Filed: Feb. 6, 2014

(65) Prior Publication Data

US 2015/0223139 A1      Aug. 6, 2015

(51) Int. Cl.
| | | |
|---|---|---|
| *H04W 40/06* | (2009.01) | |
| *H04W 4/06* | (2009.01) | |
| *H04W 40/32* | (2009.01) | |
| *H04W 40/24* | (2009.01) | |

(52) U.S. Cl.
CPC ............... *H04W 40/06* (2013.01); *H04W 4/06* (2013.01); *H04W 40/246* (2013.01); *H04W 40/32* (2013.01)

(58) Field of Classification Search
None
See application file for complete search history.

(56) References Cited

U.S. PATENT DOCUMENTS

| | | | | |
|---|---|---|---|---|
| 2003/0005149 | A1* | 1/2003 | Haas | ............. H04L 12/1854 709/238 |
| 2005/0038909 | A1* | 2/2005 | Yoshiba | ......... H04L 12/1886 709/241 |
| 2013/0148659 | A1 | 6/2013 | Shukla | |

OTHER PUBLICATIONS

"Multicast Routing—Algorithms", [online]. Retrieved from the Internet: <URL: http://ebookbrowsee.net/mcast-manika-ppt-d111159536>, (Apr. 13, 2011), 63 pgs.
Faloutsos, Michalis, "The Steiner tree problem", [online]. [archived on Aug. 17, 2013]. Retrueved from the Internet: <URL: https://web.archive.org/web/20130817093452/http://www.cs.ucr.edu/~michalis/COURSES/240-04/steiner.html>, (2013), 3 pgs.

* cited by examiner

*Primary Examiner* — Christopher Crutchfield
*Assistant Examiner* — Alan Lindenbaum
(74) *Attorney, Agent, or Firm* — Schwegman Lundberg & Woessner, P.A.

(57) ABSTRACT

Embodiments of a system and method for finding optimal routes for simultaneous transmissions over broadcast medium are generally described herein. In some embodiments, nodes are placed into a cost matrix representing a connected graph of nodes, virtual nodes are identified by applying matrix operations to the cost matrix and backtracking is performed incrementally to build candidates of virtual nodes for a solution set from the identified virtual nodes and to eliminate unsuitable candidates.

27 Claims, 7 Drawing Sheets

```
function findVirtualNodes (netMatrix)        ~210
  for all node in netNodes                   ~220
    for all assignedFreqs (node)             ~230
      costVector = netMatrix(node, :);
      while (costVector != ∅)                ~240
        maxCost = max(costVector);
        virtualNode = findNodesWithCost  (maxCost >= costVector);   ~250
        removeNodesWithCost (costVector, maxCost);    ~260
        if (virtualNodeAlreadyIn (virtualNode))
          continue;
        addVirtualNode (virtualNode)         ~270
```

Fig. 2

```
function considerCandidate (c_node, c_route)    ← 420
    if (!acceptCandidate (c_node, c_route))
430 ─     return;
    addCandidate (c_node, c_route);
    if (endOfBranch (c_node, c_route))
        saveCandidateRoute (c_route);
    c_node = findNextCandidate (c);
    while (c_node != ∅)                          ← 440
        considerCandidate (c_node, c_route);
        c_node = findAltCandidate (c_node, c_route);
```

REPRESENTATION AND SOLUTIONS FOR SIMULTANEOUS TRANSMISSIONS OVER BROADCAST MEDIUM

BACKGROUND

In wireless networks, nodes find themselves able to broadcast to multiple neighbors at once. Yet multicast routing, as it exists today, ignores the basic nature of the broadcast medium inherent to wireless communications. Most multicast routing relies on unicast constructs on top of which a multicast group is overlaid. The unicast tree is generated via a Dijkstra-type method. A Dijkstra-type method is a graph search method that solves the single-source shortest path problem for a graph with non-negative edge path costs, producing a shortest path tree. The Dijkstra-type method may be used to reach multicast targets. The unicast tree is inspected so that at each hop, transmissions can be combined and minimized. This results in marked inefficiencies and non-optimal costs. Other techniques are non-optimal and generally fall along the Shortest Path First (SPF) or Steiner tree problem. A Steiner minimal tree is defined to be the minimal cost sub-graph tree spanning a given subset of nodes in a graph. Still other existing techniques may include Kou, Markowsky & Berman (KMB) method (based on other paired shortest paths among the Steiner points), greedy method (makes the locally optimal choice at each stage to find a global optimum), finding central nodes, etc.

Losses result in extra retransmissions which create additional recovery traffic and increase the delivery latency. These extra transmissions are due to the underlying multicast tree loss characteristics, which entail higher routing costs and delays. Concepts of short-path routing are inherently attached to unicast trees, which do not take into account the ability of certain nodes to reach one or more neighbors with one transmission Nodes with multiple transceivers assigning multiple frequencies find themselves able to broadcast to multiple and separate groups of neighbors at once. Yet multicast routing, as it exists today, ignores the basic nature of the broadcast medium inherent to wireless communications.

BRIEF DESCRIPTION OF THE DRAWINGS

FIG. 2 illustrates a method for finding virtual nodes according to an embodiment;

FIG. 4 illustrates a method for performing backtracking to find routes to multicast destinations according to an embodiment;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass equivalents of those claims.

To capture the nature of the neighbor cluster reachable via the wireless medium, virtual nodes are defined with a cost and links to other (virtual or non-virtual) nodes. A virtual node is the cluster of neighbors reachable by one node via one transmission as seen by a source on the same frequency. The spanning tree can be extended to other virtual nodes to create a representation of the links in the network, including multicast links. Embodiments of a method involve using matrix-based techniques to find virtual nodes and their associated cost. A backtracking method is used to exploit virtual nodes to find the optimal routing path to a multicast group.

Figure 1:
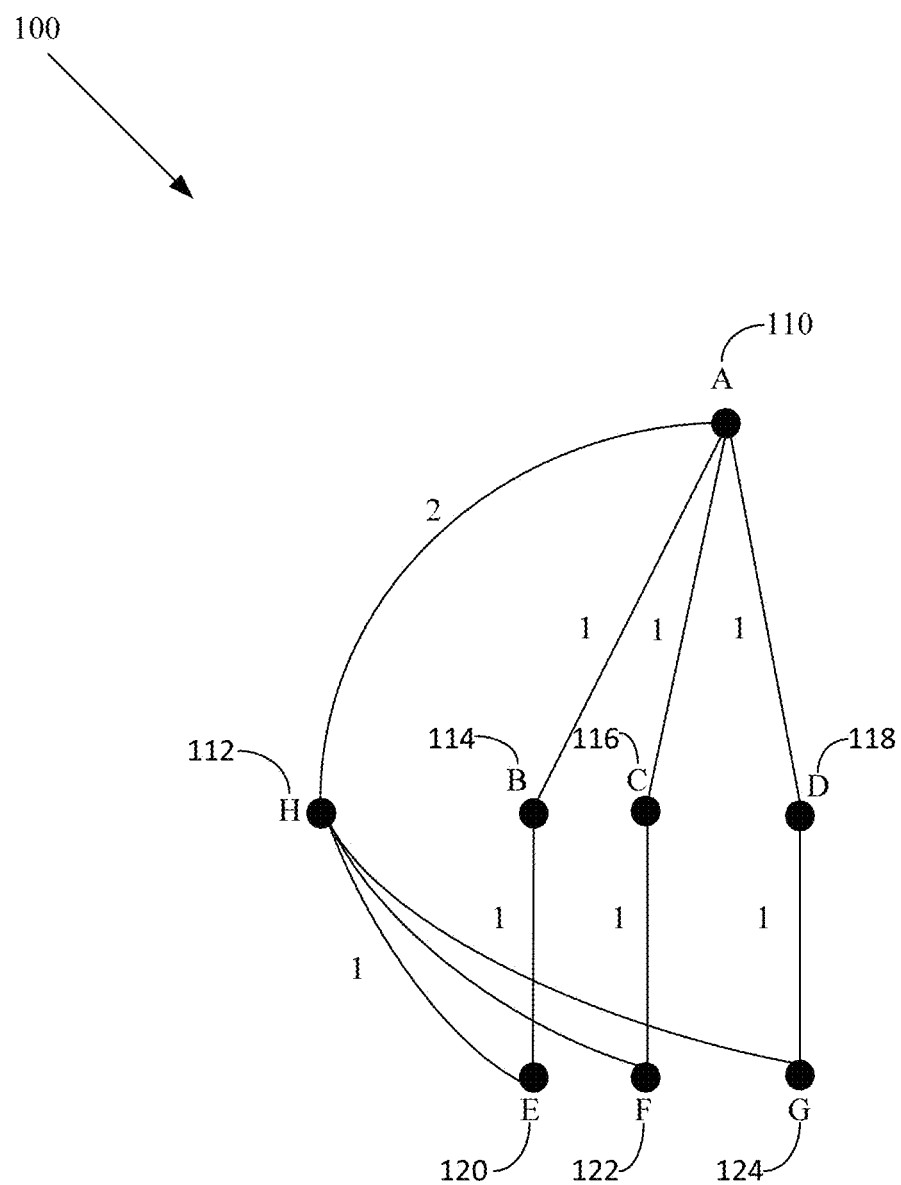
FIG. 1 illustrates a simple multicast routing tree according to an embodiment.

FIG. 1 illustrates a simple multicast routing tree 100 according to an embodiment. Concepts of short-path routing are inherently attached to unicast trees, which do not take into account the ability of certain nodes to reach one or more neighbors with one transmission. Currently, there exists no practical way to find the lowest cost route to a multicast group. In FIG. 1, a source node, node A 110, is coupled to nodes H 112, B 114, C 116 and D 118. Node H 112 is coupled to nodes E 120, F 122 and G 124. Node B 114 is coupled to node E 120, node C 116 is coupled to node F 122 and node D 118 is coupled to node G 124.

Source node A 110 may route packets to node E 120, node F 122 and node G 124. Considering one transceiver and frequency at a time, three multicast destinations {EFG} are reachable at a cost of 2 each via unicast {A 110 to B 114 to E 120, A 110 to C 116 to F 122, A 110 to D 118 to G 124}.

State-of-the-art routing sends packets along paths from node A 110 to node B 114 to node E 120, from node A 110 to node C 116 to node F 122, and from node A 110 to node D 118 to node G 124, for an aggregate cost of 6 using 6 transmissions, whereas the multicast path, node A 110 to node H 112 to node E 120, node F 122, node G 124, would offer a lower multicast cost of 2+1=3 with the use of two transmissions.

One concept separating unicast from multicast is the ability of source nodes to reach one or more next-hop targets at the same time. In FIG. 1, node A can send simultaneously to neighboring nodes B 114, C 116, D 118 and H 112. The cost to send to the four targets is network, link and application dependent, and may reflect monetary levies, transmission rates, link quality, etc. The link cost may be affected by the frequency, transceiver or data rate used for the transmission. Therefore, the cost of multicast links may be defined as a function of the costs from the source A to its targets and the number of targets:

$$C_{s-\{r_0, r_1, \ldots, r_n\}} = f(C_{s-r_0}, C_{s-r_1}, \ldots, C_{s-r_n}).$$

A reasonable function=max∈0, (–) may reflect a cost model based on data rate. This is done without loss of generality. A virtual node is the cluster of neighbors seen by a source on same frequency ({AEFG} from the point of view of node H 112). The transmission cost is application dependent and monetary, rate, and link quality based. Accordingly, the transmission cost is $C_{s-\{r_0, \ldots, r_n\}} = \max_{i \in [0,n]}(C_{s-ri})$.

The ability of nodes A 110, H 112, E 120, etc. to reach multiple targets at once is at the core of multicast routing. The direct transmission from node A to the cluster {B, C, D, H} is by nature different than any combination of unicast transmissions. Using our cost definition above, the cluster can be reached with a cost of 2, or ½ unit of cost per node. Conversely, a unicast transmission to H 112 would be done at 2 cost units per neighbor, 1 for a transmission to nodes B 114, C 116 or D 118.

To capture the nature of the neighbor cluster {B, C, D, H}, a virtual node {BCDH} is defined with a cost and links to other (virtual or non-virtual) nodes. A virtual node is the cluster of neighbors reachable via one transmission from any source. The spanning tree can be extended to other virtual nodes to create a representation of the links in the network, including multicast links.

For our function $f$, neighbors with a link cost less or equal to that of the virtual node can participate, for instance leading to the formation of the following virtual nodes {BCDH}, {BCD}, {EFG}, etc. Since the cost of a virtual node {BC} would be the same as that of {BCD}, it is eliminated from the set of nodes to reduce tree complexity.

Multi-transceiver multi-frequency systems complicate finding virtual nodes because two transceivers may form different groups from the same set of neighbors. According to an embodiment, a vector-based technique is used that automates discovering the set of virtual nodes across the node's transceivers. Note that in multi-frequency systems, the virtual node naming scheme reflects the frequency on which it is found to discriminate between two groups that may be reachable on two different channels, at potentially a different cost. For simplification here, one frequency is assumed and therefore the frequency may be omitted from the names given to virtual nodes.

Virtual nodes are constructed by considering each node's links to their neighbors on each assigned frequency. For each node, the method according to an embodiment repeatedly finds groups of neighbors that can be reached at various costs or lower.

FIG. 2 illustrates a method for finding virtual nodes 200 according to an embodiment. In FIG. 2, the method according to an embodiment is illustrated using cost vectors to create virtual nodes 210. For assigned frequencies of links from the virtual node to its neighbors 220, a cost vector is calculated using a matrix 230. In matrix 230, the notation (node, :) designates the node's neighbors on a given frequency, rate or other metric such that the neighbors are reachable via one transmission. A maximum cost is computed 240. Virtual nodes are identified as nodes having a cost vector less than or equal to a maximum cost 250. Nodes with a cost vector greater than the maximum cost are removed 260. Newly identified virtual nodes are added 270.

Referring again to FIG. 1, the following illustrates the method for node A 110, connected to neighbors [B, C, D, H] at cost [1, 1, 1, 2]:

Max cost([1, 1, 1, 2])=2→new virtual node: {BCDH}.
  Remove node H 112 from list of neighbors to consider.
Max cost([1, 1, 1])=1→new virtual node: {BCD}. Remove node B 114, node C 116 and node D 118.
Stop condition: no more neighbors to consider.

The maximum cost from node A 110 to {BCDH} is 2, i.e., from node A 110 to node H 112. The maximum cost from new virtual node {BCD} is 1 and node B 114, node C 116 and node D 118 are removed from list of neighbors to consider. Finding cost from virtual nodes to other neighbors is a simple operation of finding the minimum cost of its members, while cost to virtual nodes is a simple operation of finding the maximum cost.

One intuitive step after finding virtual nodes is to run the Dijkstra method on the newly created network. However, it can be observed that this would fail because the Dijkstra method removes costlier routes with each iteration even though the final cost of a route may be lowest through one of the eliminated segments.

Figure 3:
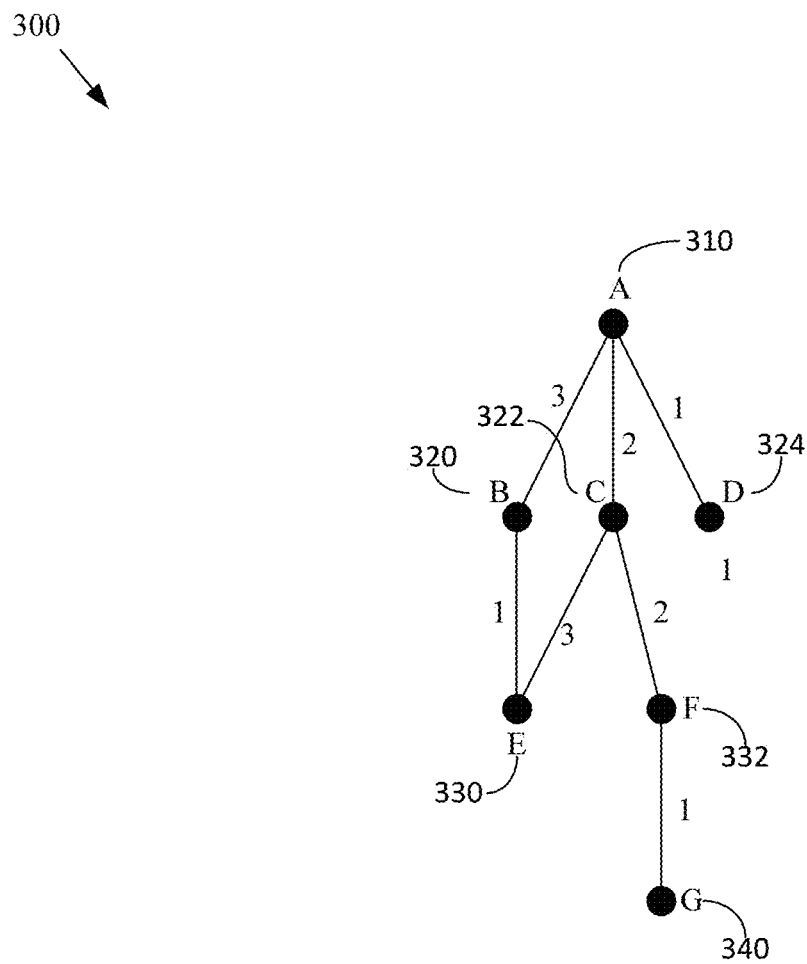
FIG. 3 illustrates a routing tree showing the problem associated with shortest path calculations using the Dijkstra method.

FIG. 3 illustrates a routing tree 300 showing the problem associated with shortest path calculations using the Dijkstra method. In FIG. 3, node A 310 has two multicast destinations, node E 330 and node G 340. Further, node A 310 is coupled to node B 320, node C 322 and node D 324. Nodes B 320 and node C 322 are coupled to node E 330. Node C 322 is also coupled to Node F 332. Node F 332 is coupled to node G 340.

Dijkstra can be made to favor multicast links, for instance sending to virtual nodes with the highest number of members for a given cost. This would send packets down the following paths to reach node E 330 and node G 340:

A>{BCD}>D Cost: 4
A>{CD}>F>G Cost: 5

Dijkstra and the other current methods offer no way to merge routes. The difficulty stems from the fact that choosing {BCD} as a basis for the merge, changes the cost of route A>{CD}>F>G from 5 to 6. As this cost changes, a cheaper route, which Dijkstra would have eliminated, may now be available. Another limitation is that the method may take into account the cost to reach destinations at intermediary nodes.

Backtracking methods are generally used to solve constraint satisfaction problems. The connected network of physical and virtual nodes can be represented as a weighted graph in which the vertices (nodes) are our variables and the edges (the links) are constraints. For each multicast group, nodes and branches along the graph make a contribution to cover the destination set, at a given cost. Some nodes and branches do not help the source reach any destination; others do but at a high cost.

The method according to an embodiment incrementally builds candidates for the solution set, drops unsuitable candidates, picks up where the last valid candidate was left and considers the next candidate ("backtracking"). At each stage of the method according to an embodiment, the lowest cost is saved and new candidate routes are compared to the best route found so far. Candidates may be discarded because they bring no destination or cost more to get the already reachable destinations. The method according to an embodiment stops when the destinations are covered and the candidates have been explored or dismissed.

FIG. 4 illustrates a method 400 for performing backtracking to find routes to multicast destinations according to an embodiment. In FIG. 4, a node is considered as a candidate 410. If the node is an acceptable candidate 420, the candidate is added to the candidate list 430.

At the start of the method according to an embodiment, when no covering route has been found, candidates can be compared to the solution obtained from the unicast tree because this constitutes the true baseline. But other conditions allow exploration of candidates to stop early. Unsuitable candidates may also be rapidly identified. The method stops when the cost of the current candidate route exceeds that of the best candidate found so far 440. Virtual nodes whose elements have already been visited can be dismissed. Whole branches of the graph that do not lead to any of the multicast destinations can also be dropped altogether.

The method 400 presented in FIG. 4 finds an optimal route to multicast destinations. However, the concept of virtual nodes may also be applied to other non-optimal methods, including Dijkstra-like schemes, whenever the backtracking technique presented above is not appropriate.

Approximate solutions can be applied to networks augmented with virtual nodes. Such techniques include Edmond's method, Nearest Participant First, KMB, etc.

Graph theorists may choose to create a directed graph by introducing directed edges between virtual and non-virtual nodes. For instance, virtual node {BCD} of FIG. 3 may reach node E 330, but not the reverse. Virtual node {BCD} is also connected to nodes B 320, C 322 and D 324 through directed edges of cost 0.

Figure 5:
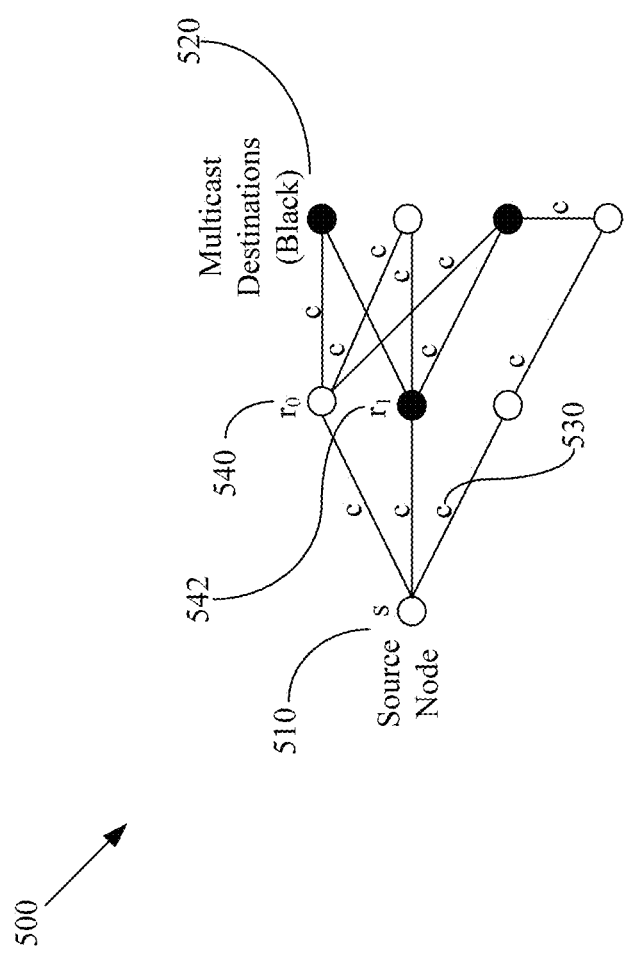
FIG. 5 is a diagram illustrating a multicast routing preference according to an embodiment.

FIG. 5 is a diagram illustrating a multicast routing preference 500 according to an embodiment. In FIG. 5, s is a source node 510 sending traffic to multicast destinations (drawn in black) 520. As shown in FIG. 5, all links have the same cost of c 530. Routing algorithms today would pick relays at random between relays $r_0$ 540 and $r_1$ 542, or would select the node with the lowest Id. According to an embodiment, relays are instead picked among the nodes that are also multicast destinations. In FIG. 5, relay $r_1$ 542 would be selected.

Figure 6:
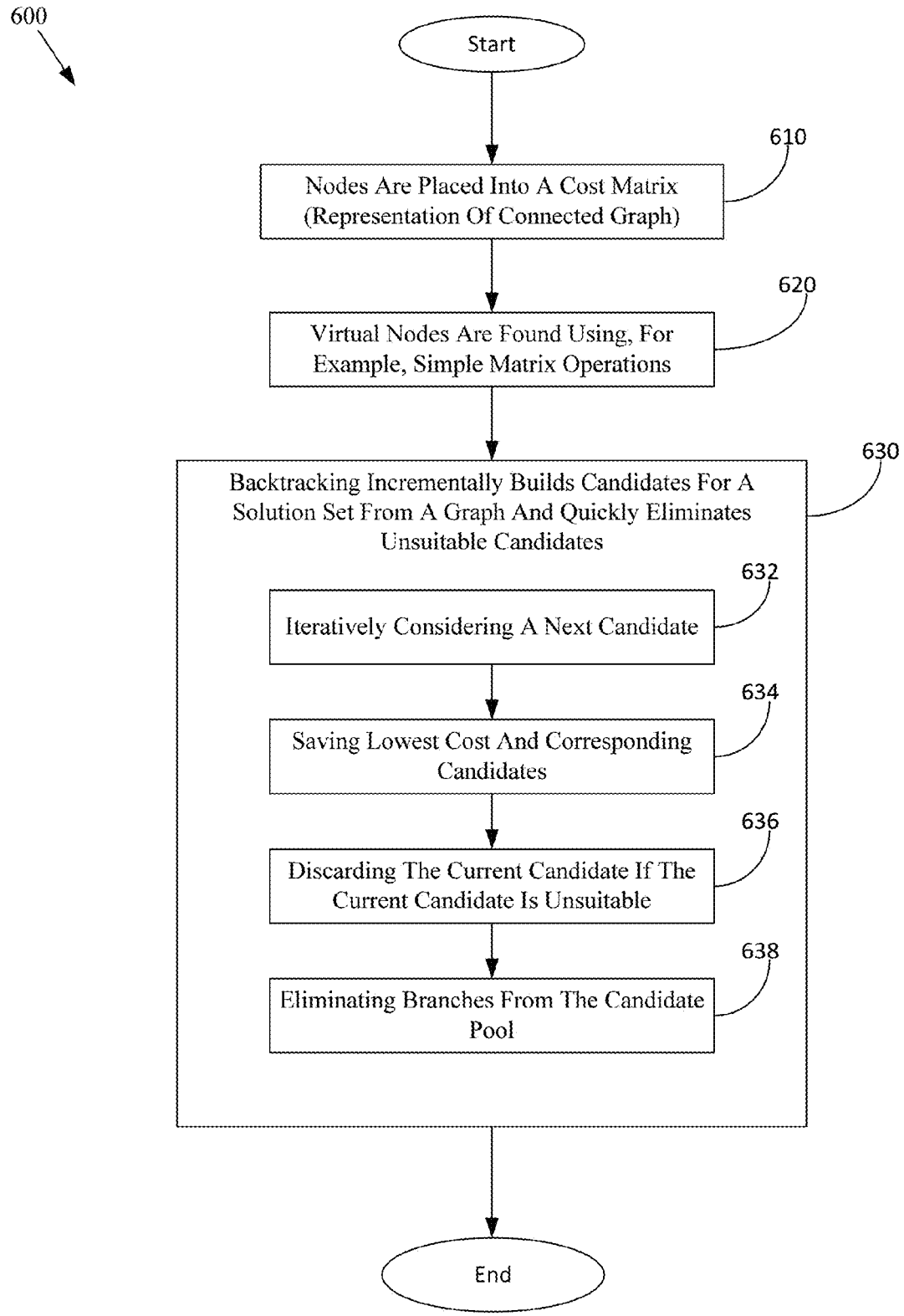
FIG. 6 is a flowchart of a method for finding optimal routes for simultaneous transmissions over broadcast medium according to an embodiment.

FIG. 6 is a flowchart of a method 600 for finding optimal routes for simultaneous transmissions over broadcast medium according to an embodiment. Nodes are placed into a cost matrix (representation of connected graph) 610. Virtual nodes are found using, for example, simple matrix operations 620. Backtracking incrementally builds candidates for a solution set from a graph and quickly eliminates unsuitable candidates 630. The backtracking includes iteratively considering a next candidate 632, saving lowest cost and corresponding candidates 634, discarding the current candidate if the current candidate is unsuitable 636 and eliminating branches from the candidate pool 638. Factors that may be considered when eliminating branches from the candidate pool include whether the cost is greater than the current best (saved) cost, whether the cost is greater than the current unicast solution, whether individual destinations have already been reached by explored solutions and whether a branch lead to multicast destinations at all.

Figure 7:
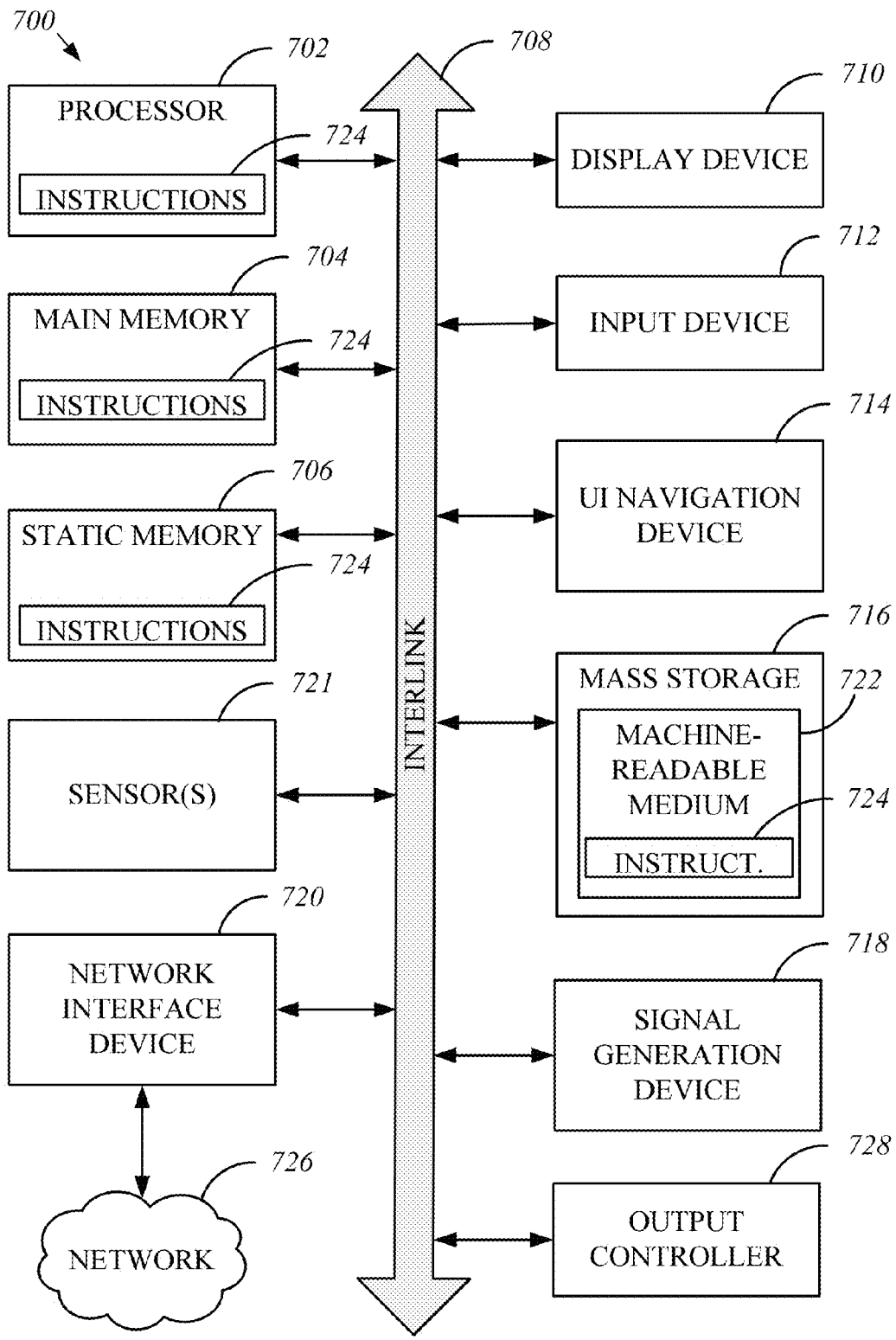
FIG. 7 illustrates a block diagram of an example machine for finding optimal routes for simultaneous transmissions over broadcast medium according to an embodiment

FIG. 7 illustrates a block diagram of an example machine 700 for finding optimal routes for simultaneous transmissions over broadcast medium according to an embodiment upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine and/or a client machine in server-client network environments. In an example, the machine 700 may act as a peer machine in peer-to-peer (P2P) (or other distributed) network environment. The machine 700 may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, at least a part of one or more computer systems (e.g., a standalone, client or server computer system) or one or more hardware processors 702 may be configured by firmware or software (e.g., instructions, an application portion, or an application) as a module that operates to perform specified operations. In an example, the software may reside on at least one machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor 702 configured using software; the general-purpose hardware processor may be configured as respective different modules at different times. Software may accordingly configure a hardware processor, for example, to constitute a particular module at one instance of time and to constitute a different module at a different instance of time. The term "application," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the term application may be used to refer to an embodiment of software or to hardware arranged to perform at least part of any operation described herein.

Machine (e.g., computer system) 700 may include a hardware processor 702 (e.g., a central processing unit (CPU), a graphics processing unit (GPU), a hardware processor core, or any combination thereof), a main memory 704 and a static memory 706, at least some of which may communicate with others via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR)) connection to communicate or control one or more peripheral devices (e.g., a printer, card reader, etc.).

The storage device 716 may include at least one machine readable medium 722 on which is stored one or more sets of data structures or instructions 724 (e.g., software) embodying or utilized by any one or more of the techniques or functions described herein. The instructions 724 may also reside, at least partially, on additional machine readable memories such as main memory 704, static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) that are configured to store the one or more instructions 724.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM (compact disk-read-only memory) and DVD-ROM (digital video disks-read only memory) disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks ((e.g., channel access methods including Code Division Multiple Access (CDMA), Time-division multiple access (TDMA), Frequency-division multiple access (FDMA), and Orthogonal Frequency Division Multiple Access (OFDMA) and cellular networks such as Global System for Mobile Communications (GSM), Universal Mobile Telecommunications System (UMTS), CDMA 2000 1x* standards and Long Term Evolution (LTE)), Plain Old Telephone (POTS) networks, and wireless data networks (e.g., Institute of Electrical and Electronics Engineers (IEEE) 802 family of standards including IEEE 802.11 standards (WiFi), IEEE 802.16 standards (WiMax®) and others), peer-to-peer (P2P) networks, or other protocols now known or later developed.

For example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method for finding optimal routes for multicast transmissions over broadcast media to a destination set of nodes, the method comprising:
   placing nodes into a cost matrix representing a connected graph of nodes;
   identifying virtual nodes by applying matrix operations to the cost matrix, each of the virtual nodes being defined as a combination of nodes reachable via a single multicast transmission from a corresponding source node, wherein each of the virtual nodes has a link cost equal to a maximum link cost from among its combination of nodes; and
   executing an incremental backtracking procedure to build a solution set of candidate routes including virtual nodes, virtual nodes that are subsets of virtual nodes, and actual nodes to carry multicast transmissions to the destination set of nodes; and
   selecting an optimal set of routes from among the candidate routes that have a combined lowest overall link cost to the destination set of nodes.

2. The method of claim 1, wherein the identifying virtual nodes comprises identifying a plurality of components including other virtual nodes and physical nodes representing the ability of the broadcast media to reach multiple destinations from one source with one transmission.

3. The method of claim 1, wherein the identifying virtual nodes comprises a representation of the broadcast media for simplifying solving multicast routing problems.

4. The method of claim 1 further comprising naming virtual nodes based on their virtual and actual components and transmission characteristics including a frequency of transmission.

5. The method of claim 1, wherein the incremental backtracking procedure to build the solution set of candidate routes includes iteratively considering a next candidate route, saving lowest cost and corresponding candidate routes, discarding a current candidate route if the current candidate route is unsuitable and eliminating branches from a candidate route pool.

6. The method of claim 5, wherein the incremental backtracking procedure to build the solution set of candidate routes includes performing at least one comparison selected from the group consisting of: comparing whether the cost for a current candidate route is greater than a current best cost, whether the cost is greater than a current unicast solution, whether individual destinations have already been reached by explored solutions and whether a branch lead to multicast destinations.

7. The method of claim 1, wherein the placing nodes into the cost matrix further comprises placing nodes into the cost matrix having a cost of multicast links defined as a function of costs from a source node to its targets and a number of targets according to $C_{s-\{r_0,r_1,\ldots,r_n\}}=f(C_{s-r_0}, C_{s-r_1}, \ldots, C_{s-r_n})$, wherein $r_0, r_1, \ldots, r_n$ are next-hop nodes, from among virtual and non-virtual node types, and $C_{s-r_n}$ represents the cost.

8. The method of claim 7, wherein the placing nodes into the cost matrix having a cost of multicast links defined as a function of costs comprises placing nodes into the cost matrix having a cost function, f, defined according to $f=\max_{i\in 0,n}(C_{s-ri})$.

9. The method of claim 1, wherein the identifying virtual nodes by applying matrix operations to the cost matrix comprises identifying a first virtual node as a cluster of neighboring nodes seen by a source node on a frequency from a point of view of a source node.

10. The method of claim 9, wherein the identifying the first virtual node as a cluster of neighboring nodes comprises identifying the candidate virtual node based on a cost and links to other nodes.

11. The method of claim 10, wherein the identifying the first virtual node based on a cost and links to other nodes comprises identifying the first virtual node based on a function of the link cost of the components of a current virtual node.

12. The method of claim 11, wherein the identifying the first virtual node based on a function of link cost to a current virtual node further comprises eliminating a potential virtual node having a same computed cost as the current virtual node from a set of potential virtual nodes to reduce tree complexity.

13. The method of claim 1, wherein the identifying the virtual nodes comprises using a vector-based technique to identify virtual nodes when nodes include a plurality of transceivers arranged to use a plurality of frequencies.

14. The method of claim 13, wherein the identifying the virtual nodes using a vector-based technique to identify virtual nodes when nodes include a plurality of transceivers arranged to use a plurality of frequencies comprises constructing virtual nodes by considering links to neighboring nodes on each assigned frequency for each node.

15. The method of claim 1, wherein the incremental backtracking procedure to build the solution set further comprises backtracking incrementally based on constraint satisfaction problems.

16. The method of claim 1, wherein the incremental backtracking procedure to build the solution set comprises representing a connected network of physical and virtual nodes as a weighted graph wherein vertices represented by nodes are variables and edges represented by links are constraints.

17. The method of claim 1, wherein the incremental backtracking procedure comprises incrementally assessing candidates of virtual nodes for a solution set of virtual nodes, wherein a lowest cost route is saved and new candidate routes are incrementally compared to the saved lowest cost route.

18. An apparatus for finding optimal routes for simultaneous transmissions over broadcast medium, comprising:
   memory for storing data; and
   a processor, coupled to the memory, the processor arranged to:
      place nodes into a cost matrix representing a connected graph of nodes;
      identify virtual nodes by applying matrix operations to the cost matrix, each of the virtual nodes being defined as a combination of nodes reachable via a single multicast transmission from a corresponding source node, wherein each of the virtual nodes has a link cost equal to a maximum link cost from among its combination of nodes; and
      execute an incremental backtrack procedure to build a solution set of candidate routes including virtual nodes, virtual nodes that are subsets of virtual nodes, and actual nodes to carry multicast transmissions to the destination set of nodes; and
      select an optimal set of routes from among the candidate routes that have a combined lowest overall link cost to the destination set of nodes.

19. The apparatus of claim 18, wherein the virtual nodes comprises a plurality of components including other virtual nodes and physical nodes representing the ability of the broadcast media to reach multiple destinations from one source with one transmission.

20. The apparatus of claim 18, wherein the virtual nodes comprises a representation of the broadcast media for simplifying solving multicast routing problems.

21. The apparatus of claim 18, wherein the processor is arranged to name virtual nodes based on their virtual and actual components and transmission characteristics including a frequency of transmission.

22. The apparatus of claim 18, wherein the processor is arranged to execute the incremental backtracking procedure by iteratively considering a next candidate route, saving lowest cost and corresponding candidate routes, discarding a current candidate if the current candidate is unsuitable and eliminating branches from a candidate pool.

23. The apparatus of claim 22, wherein the processor is arranged to execute the incremental backtracking procedure by performing at least one comparison selected from the group consisting of: comparing whether the cost for a current candidate route is greater than a current best cost, whether the cost is greater than a current unicast solution, whether individual destinations have already been reached by explored solutions and whether a branch lead to multicast destinations.

24. The apparatus of claim 18, wherein the processor is arranged to place nodes into the cost matrix based on a cost of multicast links defined as a function of costs from a source node to its targets and a number of targets according to $C_{s-\{r_0,r_1,\ldots,r_n\}}=f(C_{s-r_0}, C_{s-r_1}, \ldots, C_{s-r_n})$, wherein $r_0, r_1, \ldots, r_n$ are next-hop neighbors from source node s and $C_{s-r_n}$ is the cost of the link between s and $r_i$ based on a data rate of the transmission.

25. The apparatus of claim 24, wherein the processor is arranged to place nodes into the cost matrix having a cost function, $f$, defined according to $f=\max i\epsilon 0,n(Cs-ni)$.

26. The apparatus of claim 18, wherein the processor is arranged to identify virtual nodes by applying matrix operations to the cost matrix by identifying a first virtual node as a cluster of neighboring nodes seen by a source node on a frequency from a point of view of a source node.

27. The apparatus of claim 18, wherein the processor is arranged to give preference to selecting virtual or physical nodes that are multicast destinations as relays rather than randomly selecting a nodes as relays.

* * * * *